United States Patent [19]

Puzey

[11] Patent Number: 5,210,637
[45] Date of Patent: May 11, 1993

[54] HIGH SPEED LIGHT MODULATION
[75] Inventor: Kenneth A. Puzey, Poughkeepsie, N.Y.
[73] Assignee: International Business Machines Corp., Armonk, N.Y.
[21] Appl. No.: 790,974
[22] Filed: Nov. 12, 1991
[51] Int. Cl.$^5$ ............... G02F 1/01; G02F 1/03; G02B 26/00; H01B 12/00
[52] U.S. Cl. ................... 359/263; 359/240; 359/245; 359/276; 359/296; 505/701; 372/108
[58] Field of Search ......... 359/240, 245, 263, 296, 359/276; 505/1, 701, 865, 899, 828, 848; 372/108

[56] References Cited
U.S. PATENT DOCUMENTS

| | | | |
|---|---|---|---|
| 3,770,339 | 11/1973 | Ramaswamy | 359/276 |
| 4,744,625 | 5/1988 | Lanzisera . | |
| 4,768,852 | 9/1988 | Ih . | |
| 4,919,521 | 4/1990 | Tada et al. | 359/296 |
| 5,015,619 | 5/1991 | Wang . | |
| 5,110,792 | 5/1992 | Nakayama et al. | 359/240 |

OTHER PUBLICATIONS

IBM Technical Disclosure Bulletin, vol. 21, No. 11, Apr. 1979, pp. 4715-4716, Josephson Optical Modulator.

Primary Examiner—Bruce Y. Arnold
Assistant Examiner—Evelyn A. Lester
Attorney, Agent, or Firm—Floyd A. Gonzalez

[57] ABSTRACT

A device for modulating light, wherein a layer of material having a superconducting state is placed in the optical path of a light source and is switched between transparent, non-superconducting and non-transparent, superconducting states by a modulation circuit, thereby providing optical data modulation. A cooling device is provided to maintain the layer of material in its superconducting state. The light source is maintained at a constant optical output which reduces spectral dispersion.

8 Claims, 1 Drawing Sheet

HIGH SPEED LIGHT MODULATION

BACKGROUND OF THE INVENTION

The present invention relates to fiber optic communication, and more particularly relates to modulation of light for use with fiber optics.

Present day fiber optic communication includes the use of light emitting semiconductors whose outputs are linked to fiber optic cables. Data transmission is controlled by switching the drive current in the semiconductor from above the emission threshold to below the emission threshold, thereby causing the light output of the semiconductor to be switched on and off, or high and low, respectively.

When a high current—above the emission threshold—is passed through the the semiconductor, optical output is high (on) and is used to represent the logical or binary datum "1". When the current through the semiconductor is low—below the emission threshold—optical output is low (off) and is used to represent the logical or binary datum "0".

A limiting factor of the data transmission rate in such a system is the speed at which the semiconductor reaches high optical output after the drive current has switched above the emission threshold, referred to as the rise time. Conversely, the speed at which the semiconductor's optical output turns off (low) after the drive current switches below the emission threshold, the fall time, also limits the rate of transmission. Normally, the fall time is longer than the rise time.

A typical value of a rise time for a light emitting semiconductor is on the order of 1 nanosecond (nS). Thus, taking into account the fall time and pulse width, the useable bandwidth of a fiber optic link is on the order of less than about 1000 Megahertz (MHz). An optical fiber can support bandwidths on the order of the frequency of the light used which is approximately 300 Terahertz (THz).

Another factor which limits fiber optic data transmission efficiency is fiber optic dispersion. Each time a laser emitting semiconductor is switched on—millions of times per second—transient turn-on characteristics of the particular semiconductor cause the temporary emission of a wider range of wavelengths, referred to as delta lambda, than is useful for fiber optic transmission. Consequently, the transmission rate must be slow enough for the transient to settle each time the semiconductor is switched on so that a distinct pulse can be transmitted.

FIG. 1 is a wave diagram showing switching optical output power 1 in a conventional fiber optic link controlled by drive current 2 of a modulation circuit 5 shown in FIG. 2. Low drive current results in low optical output and is used to represent a logical 0. High drive current results in high optical output and is used to represent a logical 1. The speed at which the semiconductor can be switched is limited partly by the rise time, or turn on speed 4. Another limiting factor is the response time 3 of the optical output power 1, which is on the order of 100 picoseconds (pS). The optical output power does not reach the high output until time 3 after the drive current 2 reaches its peak level.

FIG. 2 is a schematic diagram which shows light emanating from the output side 6 of a typical semiconductor light source in the "on" state, which is modulated by drive current 2 provided by modulation circuit 5.

U.S. Pat. No. 4,744,625 issued May 17, 1988 to Lanzisera for "Methods of and Apparatus for Providing Frequency Modulated Light" discloses a laser reflecting medium that is acoustically oscillated whereby reflected light reinforces or cancels light emanating from a companion source.

U.S. Pat. No. 4,768,852 issued Sep. 6, 1988 to Ih for "Apparatus for Optical Fiber Communication Using Travelling Wave Acousto-Optical Modulator and Injection Locked Lasers" discloses an apparatus which utilizes a laser beam split into multiple beams and also discloses a multiplexing scheme compatible with a multiple beam system to increase digital bit rates.

U.S. Pat. No. 5,015,619 issued May 14, 1991 to Wang for "Superconducting Mirror for Laser Gyroscope" discloses a superconductive mirror assembly whose reflectivity can be decreased, thereby allowing detection and measurement of the light transmitted through the superconductor leading to the calculation of rotational motion based on gyroscopic properties of the disclosed invention, after which the superconductor is returned to its reflective state.

IBM Technical Disclosure Bulletin Vol. 21 No. 11, April 1979, pp. 4715-4716, discloses a weak link grating structure fabricated in a superconducting transmission line and suggests that it could be used to modulate light using Josephson circuitry in conjunction with current pulses through the transmission line which acts to diffract, i.e., generate a new beam direction for, an incident light beam.

SUMMARY OF THE INVENTION

The present invention provides a light modulation device in which optical output is modulated by switching the reflectivity of a material having a superconductive state. The material is placed in the optical path of a light source such that light can be transmitted through the material only when the material is in its non-superconductive state or is switched "on". When the material is in its superconductive state or switched "off", light is reflected. The material can be switched "on" and "off" much faster than switching the light source. Since the light source remains on all the time, its drive current is maintained at a constant level and material dispersion of the light outputted is reduced.

It is an object of the present invention to provide an improved light modulation device which increases the rate at which data bits are transmitted.

It is another object of the present invention to exploit the bandwidth supportable by a fiber optic link.

It is another object of the present invention to provide an improved light modulation device wherein speed is not limited by the rise or fall time of a semiconductor light source.

It is yet another object of the present invention to utilize the superior response time of superconducting materials, when switching between superconductive and non-superconductive states, to increase optic data transmission rates.

It is yet another object of the present invention to reduce fiber optic spectral dispersion resulting from semiconductor turn-on transients.

It is yet another object of the present invention to increase the distance over which digital data can be transmitted through fiber optic cables.

The foregoing and other objects, features and advantages of the invention will be apparent from the following more particular description of the preferred embodiment of the invention as illustrated in the drawings.

DESCRIPTION OF THE PREFERRED EMBODIMENT

It is a natural property of materials having a superconductive state (hereinafter referred to as superconductive materials) that they change between superconducting and non-superconducting states when influenced by the effects of temperature, electric current, or magnetic fields. Each of these influences exhibit a critical level beyond which a superconductive material in a superconducting state will be caused to become non-superconducting. If a superconductive material is intended to be changed between a superconducting and a non-superconducting state in a controlled fashion then the influences of temperature, magnetic field, or electrical current must be caused to interact with the superconductive material in a predetermined fashion.

Figure 4:
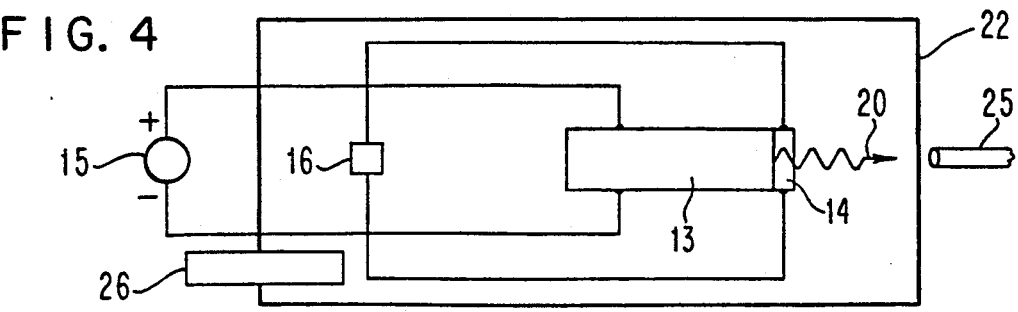
FIG. 4 is a drawing of a circuit of the present invention wherein light from a light source driven by a constant current is modulated by a superconductive layer connected to a modulation circuit.

In the present embodiment, a thin superconductive material layer 14 of FIG. 4 is influenced by the controlled flow of electric current from modulation circuit 16, to be explained. It is also a natural property of superconductive materials that the reflectivity and transmittance of a thin superconductive material layer, with regard to a light beam incident upon it, varies with the temperature, thickness and conductivity of the superconductive material as well as with the wavelength and angle of incidence of the light beam upon the superconductive material.

FIG. 4 shows a superconductive material layer 14 applied to an external surface of a light source 13, such as a diode. Light emitted from the light source 13 strikes the superconductive material layer 14 which, when in a superconducting state, reflects light rays 20, and when in a non-superconducting state, is transparent to light rays 20. When the light source 13 is a diode, light emission is stimulated by a constant drive current from a constant current source 15, implemented by any presently known means. This drive current remains continuously above the emission threshold of the light source 13 maintaining a high optical output from the light source 13. The light emitted thereby strikes the superconductive material layer 14, which is disposed in the optical path of the light source 13. The layer 14 can be switched between superconducting and non-superconducting states by any presently known modulation circuit 16, to take advantage of its state changing speed. When the emitted light is reflected (the material 14 is in the superconducting state), no optical output is produced. When the layer 14 is transparent to the emitted light (the material 14 is in the non-superconducting state), a high optical output is produced.

Figure 1:
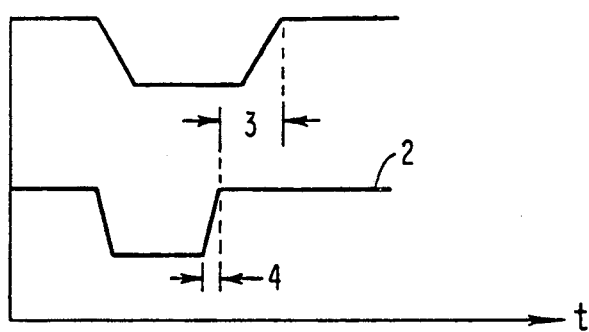
FIG. 1 is a wave diagram of the prior art showing the drive current rise time and the response of the optical power output.
Figure 2:
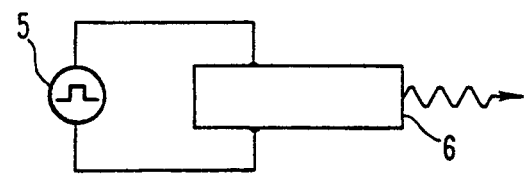
FIG. 2 is a drawing of a prior semiconductor light source driven by a drive current source for modulating light as shown in FIG. 1.
Figure 3:
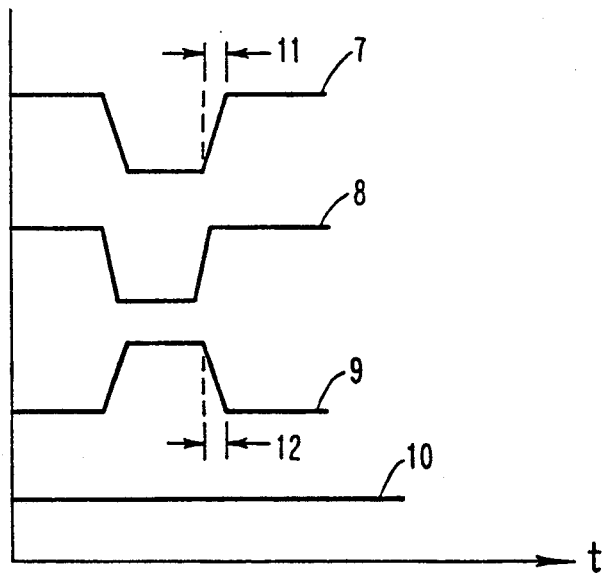
FIG. 3 is a wave diagram of the present invention showing optical power output, superconductive layer current, the change in reflectivity caused by the superconductive layer current, and drive current.

FIG. 3 shows the optical output power 7 of a light source 13 modulated by a modulation circuit 16 controlling the reflectivity 9 of a superconductive material layer 14. A response time 11 is produced which is on the order of about 1 pS. The drive current 10 remains constant and does not contribute any time delays to the system. When the modulating current 8 from the modulation circuit 16 reaches a low value, the layer 14 is superconductive and is reflective. When the modulating current 8 is high, the reflectivity is low (the layer 14 is transparent) and light is transmitted through the layer 14, resulting in a high optical output.

Thus modulating current 8 through the layer 14 is switched by the modulation circuit 16 while the laser drive current 10 from the constant current source 15 remains constant. As mentioned, a property of the layer 14 is that it can be quickly switched between superconducting and non-superconducting states. Also, the superconductive material of layer 14 enables faster switching because the switching time 11 of the optical output equals the superconductor reflectivity switching time 12.

In a surface emitting laser, a superconductive material, such as $YBa_2Cu_3O_7$, can be applied to the light emitting surface of the laser, by, for example, metal-organic chemical vapor deposition. Vapor deposition can be performed by, for instance, the System 5000 from Emcore Corp. of Somerset, N.J. as described in Trudy E. Bell, "Superiority: Superconductor . . . ", IEEE SPECTRUM, Jul. 26, 1989, p. 17. When the light emitting surface of the light source 13 is Gallium Arsenide, a known buffer layer such silicon or yttrium stablized cubic zirconia, etc., can be applied, and the superconductive layer 14 is deposited over the buffer layer by the System 5000. Alternatively, the superconductive material layer 14 can be deposited on a substrate, and the substrate and layer 14 placed in the optical path of the light source 13.

The amount of current necessary to drive the light source in steady state high output is commonly known in the art and depends on the type of light source used, such as, for example, a semiconductor laser. The process of usefully switching the state of superconductive material between superconducting and normal states is well known.

As is known, transient material dispersion is a by-product of semiconductor laser turn-on. Prior Art drive current modulation schemes that switch laser sources on and off produces greater material dispersion. The present invention reduces the occurrence of material dispersion because the light source 13 is not switched on and off. The present invention embodies a constant, steady-state drive current (see 10 of FIG. 3) therefore maintaining a continuous "on" mode of the light source 13. Turn on/turn off problems are thus not introduced into the system.

The superconductive material layer 14 is cooled sufficiently below the critical temperature (the temperature at which layer 14 becomes superconducting) to insure the layer 14 changes between superconducting and non-superconducting under the influence of the modulating current 8 only. Cryogenic cooling can be achieved using cold liquids such as liquid helium or liquid nitrogen.

As shown in FIG. 4, the modulation circuit 16 and the light source 13 are placed in a Dewar type container 22 to maintain the layer 14 below the critical temperature. The modulated light 20 is transmitted through the walls of the container 22 to a fiber optic link 25. A cooling device 26 typically partially extends into the container 22. One such cooling device is a Hughes 7014H-2 Stirling Cooler available from Hughes Aircraft Co.

If the modulation circuit 16 is cooled, Josephson junction devices can be used in the modulation circuit 16 as switching elements.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described my invention, what I claim as new, and desire to secure by Letters Patent is:

1. A light modulation device comprising:
   a light source supplying light to be modulated, said light source having a light output;
   a layer of material deposited on the light output of said light source, said material having a first, superconducting state wherein light is not transmitted therethrough and a second state wherein light is transmitted therethrough; and
   a modulation circuit for controlling electrical current flow through said layer of material for switching said material between its first, superconducting state and its second state thereby modulating light from said light source.

2. The light modulation device of claim 1 wherein said light source is a laser device.

3. The light modulation device of claim 1 wherein said light source is a light emitting diode.

4. The light modulation device of claim 1 wherein said layer of material enters said first, superconducting state when the temperature of said layer of material is lowered below a critical temperature, said light modulation device further comprising:
   means for cooling said layer of material to below said critical temperature such that said material enters said first, superconducting state.

5. The light modulation device of claim 4 wherein said means for cooling is a refrigeration device containing said light source, said layer of material and said modulation circuit.

6. The light modulation device of claim 1 further comprising a constant current source connected to said light source for maintaining said light source at a constant light output.

7. The light modulation device of claim 1 wherein said modulation circuit includes switching means for switching said layer material between said first, superconducting state and said second state at a rate of between about 100 MHz to about 1 THz.

8. The light modulation device of claim 7 wherein said switching means includes Josephson junction devices as switching elements.

* * * * *